United States Patent Office 3,748,179
Patented July 24, 1973

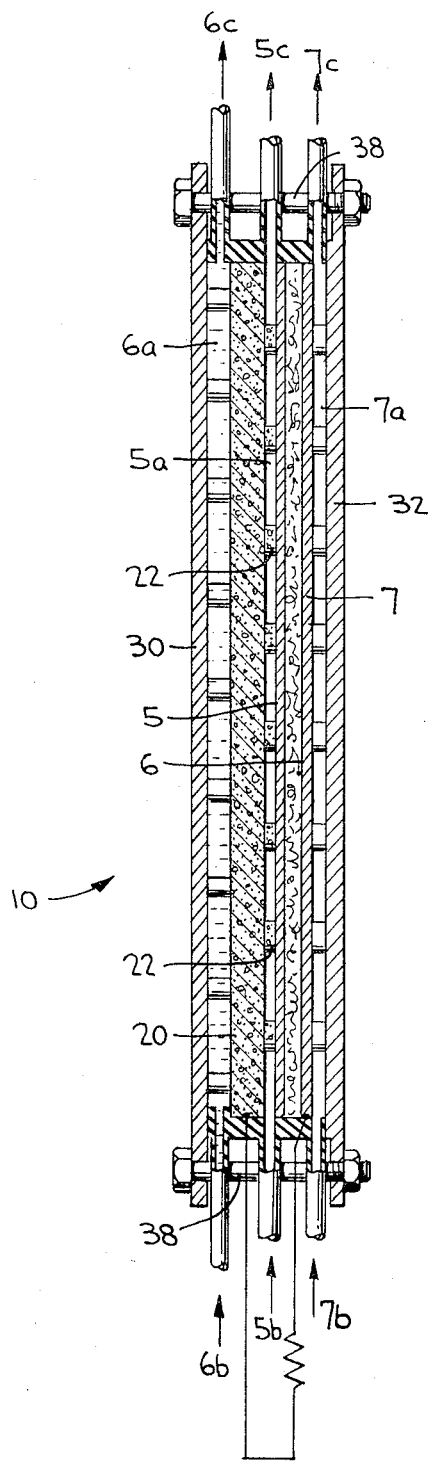

3,748,179
MATRIX-TYPE FUEL CELL WITH CIRCULATED ELECTROLYTE
Calvin L. Bushnell, South Glastonbury, Conn., assignor to United Aircraft Corporation, East Hartford, Conn.
Filed Mar. 16, 1971, Ser. No. 124,863
Int. Cl. H01m 27/00
U.S. Cl. 136—86 R
9 Claims

ABSTRACT OF THE DISCLOSURE

A compact, matrix-type electrochemical cell utilizing a circulating electrolyte is described. The cell comprises an anode, a cathode, a matrix containing an ion-conductive electrolyte between the anode and cathode, and a porous metal plate containing porous pins positioned adjacent to one of said anode and cathode in order that the pins of the plate are in contact with the anode or cathode over the limited surface area of the pins. Electrolyte circulated behind the porous plate floods the porous plate, porous pins, and electrode directly beneath the pins and makes contact with the electrolyte contained in the electrolyte matrix. As a result of the plurality of contact points, electrolyte is circulated into and from the matrix. The advantages of both a circulating electrolyte system and a matrix-type electrolyte system are realized.

FIELD OF INVENTION AND BACKGROUND

This invention relates to electrochemical cells and, more particularly, to an improvement in electrochemical cells utilizing an electrolyte contained in or trapped in a matrix between the electrodes of the cells whereby the advantages of a circulating electrolyte system are realized while retaining the advantages of a matrix-type fuel cell. For convenience hereinafter, the invention will be described with reference to a fuel cell for the direct generation of electricity utilizing two non-consumable electrodes. As will be apparent, however, similar considerations governing the use of the invention in fuel cells will apply to other electrochemical devices, enabling the use of the invention in such devices.

A fuel cell, as the term is employed herein, designates an electrochemical cell for the direct generation of electrical energy from a fuel and oxidant. With such cells, it is not necessary to go through the usual conversion of chemical energy to heat energy to mechanical energy to electrical energy as is common with heat engines. Such cells, in their most simplified design, comprise a housing, an oxidizing electrode, a fuel electrode, and an electrolyte. In operation, it is necessary that the fuel and oxidant contact a surface of their respective electrode where a process of adsorption and de-adsorption occurs, leaving the electrodes electrically charged; with the second surface of the electrodes being in contact with the electrolyte. Depending upon the nature of the electrolyte, ions are transferred through the electrolyte from the anode to the cathode or from the cathode to the anode. Electrical current is withdrawn from the cell and passed through a suitable load where work is accomplished.

The electrolyte of fuel cells can be a solid, a molten paste, a circulating free-flowing liquid, or a liquid trapped in a hydrophilic matrix. As a result of design considerations such as compactness, low IR drop across the cell, and the use of non-self-supporting lightweight electrodes, cells utilizing a liquid electrolyte trapped in a thin hydrophilic matrix are preferred for many applications. A problem of such cells, however, occurs as a result of a change in electrolyte volume in the matrix as a result of water being formed by the interaction of the fuel and oxidant, and/or as a result of electrolyte loss through excessive heating of the cell or use of dry reactants, i.e., not humidified, during cell operation. In instances where the electrolyte is increased, the excess electrolyte is carried by capillary action into the electrodes of the cell with resultant flooding of the electrodes. In instances where the volume of the electrolyte is decreased, dry-out will occur at the electrolyte matrix-electrode interface. Such flooding and/or dry-out adversely affects the electrochemical performance of the cell. Furthermore, there are distinct advantages in circulating electrolyte fuel cell systems over the matrix-type electrolyte systems. The primary advantage is the operational flexibility offered by the bulk electrolyte in that it serves as an infinite reservoir to accommodate the volume tolerance requirements. Additionally, the circulating electrolyte serves as a convenient heat-removable transfer fluid with no other coolant loops being required. Moreover, such fuel cells can operate on unscrubbed air by having a regenerator unit located external to the cell stack to receive the circulating electrolyte stream and remove carbon dioxide and other impurities from the electrolyte before returning it to the cell. As apparent, therefore, a cell configuration offering the advantageous features of an electrolyte matrix cell and a circulating electrolyte cell is immanently desirable.

OBJECTS OF THE INVENTION AND GENERAL DESCRIPTION

Accordingly, a primary object of the present invention is to provide a matrix-type fuel cell which has the advantageous characteristics of a circulating electrolyte fuel cell system while retaining the advantages of a matrix-type fuel cell system.

It is another object of this invention to provide a matrix-type fuel cell which permits convenient removal of excess liquid from the cell, preventing flooding of the electrodes.

It is still another object of the present invention to provide a matrix-type fuel cell which permits convenient replenishing of electrolyte, avoiding matrix/electrode dry-out.

It is another object of this invention to provide a matrix-type fuel cell having an infinite electrolyte reservoir to accommodate the volume tolerance requirements of the cell.

These and other objects of the invention will be more readily apparent from the following detailed description with particular emphasis being placed on the embodiment illustrated in the drawing.

In accordance with the present invention, a matrix-type fuel cell is constructed which incorporates a porous plate having a series or plurality of porous pins or ridges behind either one of the anode or cathode. The porous pin plate contacts the electrode over the network of porous pins. Electrolyte circulated behind the porous pin plate floods these pins and the electrode directly beneath the pins and makes contact with the electrolyte contained in the matrix. Many small areas of contact are, thus, uniformly distributed over the surface of the electrode, effectively establishing electrolyte communication between the bulk electrolyte circulating on the backside of the porous pin plate and the electrolyte contained within the cell matrix. As a result, the electrolyte volume of the cell matrix is always constant, avoiding fluctuations in cell performance as a result of electrolyte volume change. Moreover, since the electrolyte within the matrix is continuously being circulated, no problem is encountered as a result of electrolyte increase by the formation of water during the cell reaction, nor is there any problem of electrolyte dry-out. Furthermore, the operating temperature of the cell can be controlled as a result of the electrolyte circulation without need of a separate coolant loop. It is possible to employ unscrubbed air as the oxidant by utilizing a regenerator unit located external to the cell, with the carbon dioxide and the like contained in the unscrubbed air stream being continuously removed. Effectively, the present invention provides a fuel cell system which has the advantageous characteristics of both a matrix-type fuel cell system and a circulating electrolyte fuel cell system.

THE DRAWING AND SPECIFIC EMBODIMENT

In order to more specifically illustrate the invention, reference is made to the drawing wherein a transverse sectional view of a single cell constructed in accordance with the present invention is shown. In the drawing, fuel cell 10 comprises anode 5 and cathode 7 separated by electrolyte matrix 6. In the embodiment shown, electrodes 5 and 7 are lightweight screen electrodes comprising a conductive nickel screen embedded in a uniform admixture of catalytic metal, in this instance platinum, and polytetrafluoroethylene particles. The ratio of platinum to polytetrafluoroethylene on a volume basis is 3:7, with the platinum loading of the electrode being 15 mg./cm.$^2$. The electrodes are approximately 10 mils in thickness. The electrolyte matrix is pressed asbestos and is approximately 25 mils in thickness. A porous plate 20 having a plurality of porous pins 22 on each side thereof is adjacent to and in communication with the anode through pins 22. In the preferred embodiment shown, the plate is porous nickel having a total porosity of about 80 percent. The second surface of the porous pin plate is in contact with a pressure plate 30. The porous plate 20 and pressure plate 30 form a chamber 6a through which electrolyte is circulated. A combined pressure and backing plate 32 is positioned behind cathode 7, with the cathode and backing plate forming an oxidant chamber 7a. A fuel chamber 5a is formed between porous metal plate 20 and anode 5. The entire cell assembly is held together with threaded tie rods 38 at either end of the cell.

In operation, a 30 percent aqueous potassium hydroxide electrolyte solution is pumped into electrolyte chamber 6a through inlet 6b where it floods porous metal plate 20. Electrolyte flows through porous pins 22 and into electrolyte matrix 6. Electrolyte outlet 6c is kept closed during the initial filling. After the matrix is saturated with electrolyte as determined through a window, not shown, outlet 6c is opened and electrolyte continuously circulated throughout the operation of the cell. Due to capillary forces, electrolyte is continuously exchanged within the matrix. As a result of the continuous flow, the electrolyte volume within the matrix is constant. A reactant gas, in this instance hydrogen, is fed to anode 5 through inlet 5b, with excess gas being removed through 5c. An oxidant, in this instance air, is fed to cathode 7 through inlet 7b with excess air and impurities being vented through exit 7c. The cell, when operated at a constant current drain, will provide a substantially constant cell output. There is little fluctuation in current characteristics of the cell since the entire volume tolerance function in the cell is controlled by the circulating electrolyte.

Although the present invention has been described with reference to lightweight electrodes comprising a metal support screen embedded in a catalytic mixture of metal and hydrophobic plastic binder, other electrodes can be employed including non-porous palladium/silver alloy structures as described in U.S. Pat. No. 3,092,517. In such instances, the cell must be fed with a hydrogen-containing fuel. Furthermore, the so-called Bacon-type electrodes as defined in U.S. Pat. No. 2,716,670 can also be employed. Moreover, although it is indicated that the electrolyte matrix is made of asbestos, other hydrophilic matrices including ceramic metals and polymeric materials can be utilized. In addition to nickel, The porous back-up plate can be any material which is hydrophilic, i.e., will collect water as a result of capillary forces, including porous copper, tantalum, iron, and the like; or a hydrophilic polymer provided the polymer is sufficiently rigid to provide the necessary structural integrity to the plate and pins or ridges. As a result of availability and overall characteristics including corrosion resistance, nickel is preferred. The porosity of the plate can vary as long as it is sufficiently porous to absorb water through capillary action but, preferably, the plate will have a porosity of from about 35 to 90 percent. The operating temperature of the cell can vary as long as it is not above the critical temperature of the electrodes and/or electrolyte matrix being employed. Preferably, the operating temperature of matrix-type cells of the type described herein will range from about 20 to 175° C. In addition to the potassium hydroxide electrolyte disclosed hereinbefore, other commonly employed aqueous electrolytes exemplified by aqueous solution of the alkali hydroxides, alkaline earth hydroxides, and carbonates, as well as strong acid electrolytes such as hydrochloric acid, sulphuric acid, and phosphoric acid can be employed. Commonly employed reactants, in addition to hydrogen and oxygen, can be utilized in the cells of the present invention. As will be apparent, the concept of the present invention can be employed in any of the prior art cells utilizing a matrix-type electrolyte.

Although the present invention is described and illustrated in the drawing with reference to a single cell, it should be apparent that in the preferred construction a plurality of cells will be stacked together utilizing manifold-fed arrangements for the fuel and oxidant as well as a manifold system for circulating the electrolyte through the plurality of cells. In constructing the cell stack, it may be desirable to arrange the cells in order that a single electrolyte chamber will service the porous plates from adjacent cells. This will contribute to the compactness of the cell stack. As will be apparent to those skilled in the art, various other modifications can be made in the over-all cell design to meet operating conditions. For example, a stack of cells employing the concept of this invention can utilize a generator system with the circulating electrolyte in order to remove carbon dioxide and other impurities from the electrolyte. A regenerator unit in combination with a fuel cell is described, for example in U.S. Pat. No. 3,331,703. These modifications being within the ability of one skilled in the art are to be covered herein with the invention only being limited in accordance with the appended claims.

It is claimed:

1. A fuel cell having a pair of opposed electrodes, an electrolyte matrix between said pair of electrodes, a porous plate having a plurality of projections positioned behind one of said pair of electrodes and in contact with said one electrode only over the limited surface area of said projections; and an electrolyte chamber having inlet and outlet means behind said porous plate, said electrolyte matrix and said electrolyte chamber containing electrolyte and being in electrolyte communication through said porous plate and said electrode at the area at which said plurality of projections contact said electrode.

2. The fuel cell of claim 1 wherein said porous plate is porous nickel having a porosity of from about 35 to 80 percent.

3. The fuel cell of claim 2 wherein said projections of said porous plate are pins.

4. The fuel cell of claim 2 wherein said projections of said porous plate are ridges.

5. The fuel cell of claim 3 wherein said pair of electrodes are lightweight screen electrodes comprising a support screen in contact with a catalyst mix of electrocatalyst and hydrophobic polymer binder.

6. The fuel cell of claim 5 wherein said binder is polytetrafluoroethylene.

7. The fuel cell of claim 6 wherein the electrolyte is an aqueous alkali hydroxide.

8. The fuel cell of claim 3 wherein the said one electrode is the anode.

9. The fuel cell of claim 3 wherein the said one electrode is the cathode.

References Cited

UNITED STATES PATENTS

| | | | |
|---|---|---|---|
| 3,172,784 | 3/1965 | Blackmer | 136—86 E |
| 3,202,547 | 8/1965 | Rightmire et al. | 136—86 R |
| 3,492,163 | 1/1970 | Hilmer | 136—86 R |

WINSTON A. DOUGLAS, Primary Examiner

H. A. FEELEY, Assistant Examiner